UNITED STATES PATENT OFFICE.

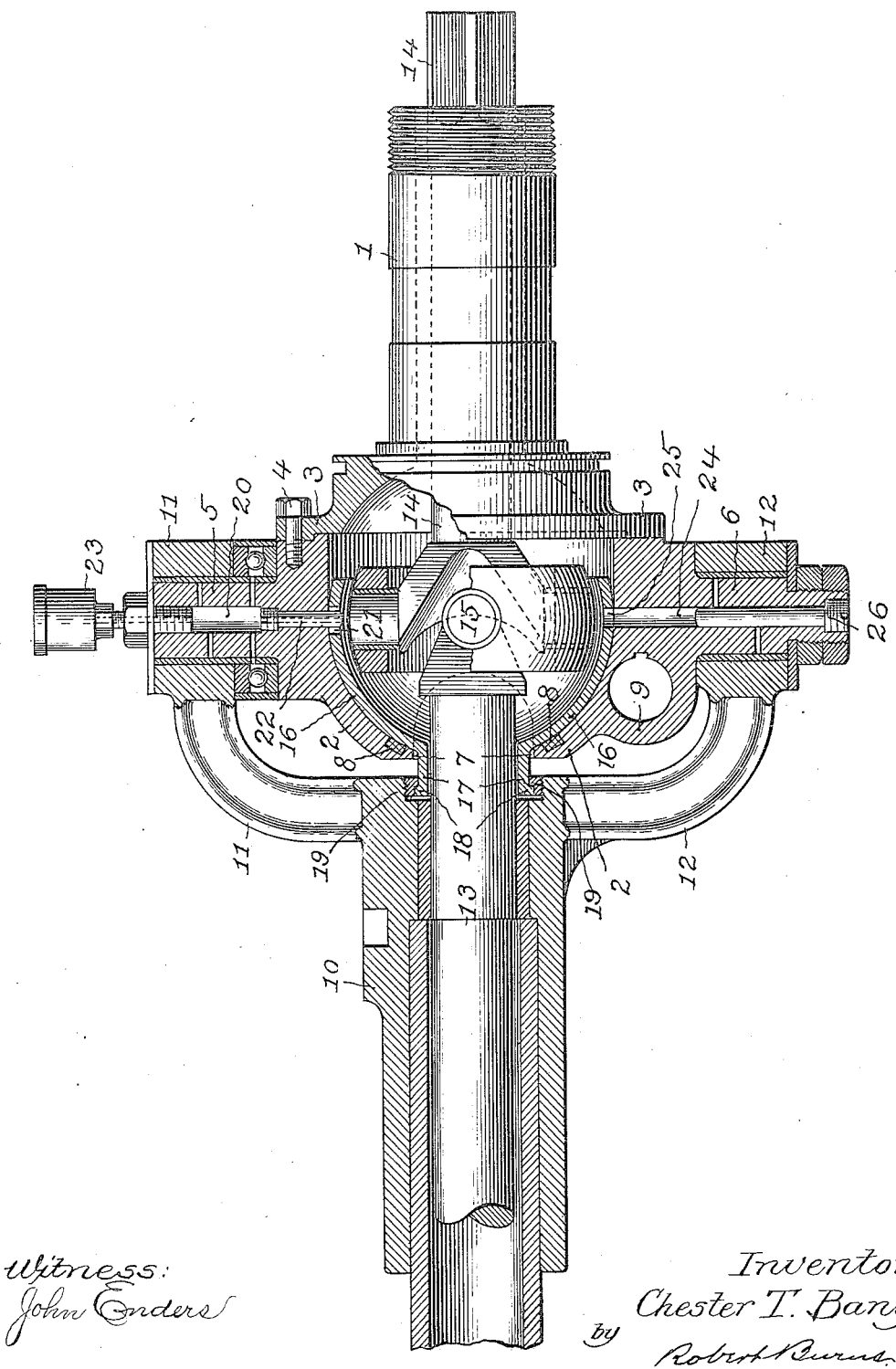

CHESTER T. BANGS, OF CHICAGO, ILLINOIS.

TRACTION-WHEEL.

1,282,023.  Specification of Letters Patent.  Patented Oct. 22, 1918.

Application filed September 21, 1917.  Serial No. 192,447.

*To all whom it may concern:*

Be it known that I, CHESTER T. BANGS, a citizen of the United States of America, and a resident of Chicago, in the county of Cook, State of Illinois, have invented certain new and useful Improvements in Traction-Wheels, of which the following is a specification.

This invention relates to the combined driving and steering type of traction wheels for motor vehicles, and—

The present improvement has for its object, to provide a simple and efficient structural formation and combination of parts whereby the universal coupling which connects the sectional drive shaft of the mechanism is inclosed to prevent the entrance of dust, etc., and with which the proper lubrication of said universal coupling and associated bearings is attained with an avoidance of waste and leakage of the lubricating material.

The accompanying drawing is a longitudinal sectional elevation illustrating the present invention in connection with the driving and steering gearing of a traction wheel.

Referring to the drawing, 1 designates the tubular arbor or skein upon which the hub portion of a traction wheel is revolubly mounted in any usual and suitable manner, and in the present construction the inner end of said arbor 1 is provided with an enlarged semi-globular hollow head or shell 2, which with a view to convenient and practicable assemblage of parts preferably involves a detail construction as follows:—

3 designates a circular offset flange on the inner end of the aforesaid tubular arbor 1, adapted to fit a correspondingly formed end of the hollow head or shell 2 aforesaid, with the parts rigidly connected together by attaching screws 4 as shown.

5 and 6 designate upper and lower journal spindles or trunnions carried on the head or shell 2, in axial alinement with each other and adapted for journal engagement in the upper and lower jaws of an end yoke of the stationary axle frame or housing hereinafter described.

7 designates a horizontally elongated orifice formed in the inner end of the head or shell 2, to permit of a pivotal movement in a horizontal plane of said head or shell 2 with relation to the driving shaft section of the mechanism hereinafter described.

8 designates a recess formed in the interior of the head or shell 2 adjacent to the margin of the above described horizontally elongated orifice 7, and adapted to receive a filling of packing material adapted to prevent leakage of the lubricant contained in the head or shell 2.

9 designates a lug or arm extending from the exterior of the head or shell 2 and having an eye or orifice for operative connection to one end of the steering mechanism of a motor vehicle.

10 designates an end portion of the stationary axle frame or housing of a motor vehicle, provided with the usual pivot yoke comprising upper and lower pivot jaws 11 and 12, which are orificed for the reception of the upper and lower journal spindles 5, 6, of the head or shell 2 above described.

13 and 14 designate the respective driving and driven shaft sections of the mechanism, connected together at their adjacent ends by the universal coupling 15, which may be of any usual and suitable type. And it is preferable that said universal coupling 15 is positioned in the structure so that the axes of its different pivot pins or parts are in a plane common to the axes of the journal spindles 5, 6 before described.

The driving shaft section 13 has the usual bearing in the axle frame or housing 10, while the driven shaft section 14 extends through the axial bore of the tubular arbor 1 for driving connection at its outer end with the hub of a wheel in any usual and suitable manner.

The material feature of the present invention in connection with the heretofore described structure comprises as follows:—

16 designates a semi-globular shell, the periphery of which has sliding engagement with the finished and correspondingly formed interior or cavity of the head or shell 2 aforesaid, and with the packing material in the before described recess 8 bearing against the periphery of the shell 16 to prevent leakage of the lubricant contained in the cavity formed by said shells.

17 designates a tubular extension or neck forming a fixed part of the aforesaid semi-globular shell 16 and extending out through the horizontally elongated orifice 7 of the head or shell 2 for adjustable connection with an adjacent end or portion of the fixed axle frame or housing 10, and preferably by a detail construction as follows:—

18 designates an out-turned flange on the tubular extension or neck 17, fitting a screw-threaded counter bore in an end of the axle frame or housing 10, and held therein in an adjustable manner by a ring nut 19 screwed into said screwthreaded counterbore and against the flange 18 aforesaid. The action of said ring nut 19 is to draw and maintain the semi-globular shell 16 in close contact with the interior surface of the head or shell 2 and thereby prevent leakage and waste of lubricant between the parts as well as an entrance of dust and the like.

20 designates an oil passage formed axially in the upper journal spindle 5 aforesaid, and adapted to register with an orifice 21 in the shell 16 aforesaid. Said passage and orifice provide means for the introduction of the lubricant to the chamber formed by the shells 2, 3 and 16, and in the present structure the inner portion of the oil passage 20 is screw-threaded for the reception of the tubular stem now to be described.

22 designates a tubular stem fitting the screw-threaded inner portion of the oil passage 20 aforesaid, with its inner end extending into the orifice 21 of the shell 16 to hold the same against a turning movement in an adjustment of the parts of the present structure.

23 designates an oil cup associated with the outer end of the passage 20 aforesaid, and adapted to supply the oil or lubricant to said passage.

24 designates a drain passage formed axially in the lower journal spindle 6 aforesaid, and adapted to register with an orifice 25 in the shell 16 aforesaid. Said passage and orifice provide means for the ready removal of the oil or lubricant when desired. Normally leakage is prevented through said passage by a closure plug or the like.

Having thus fully described my said invention what I claim as new and desire to secure by Letters Patent, is:

1. In a traction and steering wheel, the combination of an axle frame, a tubular arbor providing a bearing for the hub of a wheel, a pivot connection between said frame and arbor comprising in part a semi-globular head, a semi-globular shell arranged within said semi-globular head and having bearing contact with the inner wall of said head, adjusting means for drawing said semi-globular shell in close bearing contact with the inner wall of the semi-globular head aforesaid, a driving shaft section journaled in the axle frame, a driven shaft section adapted for operative engagement with the hub of a wheel, and a universal coupling arranged within said semi-globular head and operatively connecting said shaft sections together, substantially as set forth.

2. In a traction and steering wheel, the combination of an axle frame, a tubular arbor providing a bearing for the hub of a wheel, a pivot connection between said frame and arbor comprising in part a semi-globular head, a semi-globular shell arranged within said semi-globular head and having bearing contact with the inner wall of said head, adjusting means for maintaining said parts in bearing contact, and taking up wear, the same comprising a tubular extension on said semi-globular shell and annular means for adjustably attaching said extension to the axle frame, a driving shaft section journaled in the axle frame, a driven shaft section adapted for operative engagement with the hub of a wheel, and a universal coupling arranged within the semi-globular head and operatively connecting said shaft sections together, substantially, as set forth.

3. In a traction and steering wheel, the combination of an axle frame, a tubular arbor providing a bearing for the hub of a wheel, a pivot connection between said frame and arbor comprising in part a semi-globular head, a semi-globular shell arranged within said semi-globular head and having bearing contact with the inner wall of said head, adjusting means for maintaining said parts in bearing contact and taking up wear, the same comprising a tubular extension on said semi-globular shell and a ring nut adjustably attaching said extension to the axle frame, a driving shaft section journaled in the axle frame, a driven shaft section adapted for operative engagement with the hub of a wheel, and a universal coupling arranged within the semi-globular head and operatively connecting said shaft sections together, substantially as set forth.

4. In a traction and steering wheel, the combination of an axle frame having a journal yoke, a tubular arbor providing a bearing for the hub of a wheel and carrying a semi-globular head having opposed journal spindles in journal engagement with the journal yoke aforesaid, a semi-globular shell arranged within said semi-globular head and having bearing contact with the inner wall of said head, adjusting means for maintaining said parts in bearing contact, a driving shaft section journaled in the axle frame, a driven shaft section adapted for operative engagement with the hub of a wheel, a universal coupling arranged within the semi-globular parts aforesaid and operatively connecting said shaft sections together, the upper journal spindle having an axially arranged oil passage and the semi-globular shell having an orifice registering with said oil passages, and a tubular bushing fitting the inner end of said oil passage and engaging in said registering orifice, substantially as set forth.

5. In a traction and steering wheel, the combination of an axle frame having a journal yoke, a tubular arbor providing a bearing for the hub of a wheel and carrying a semi-globular head having opposed journal spindles in journal engagement with the journal yoke aforesaid, a semi-globular shell arranged within said semi-globular head and having bearing contact with the inner wall of said head, adjusting means for maintaining said parts in bearing contact, the same comprising a tubular extension on said shell and means for adjustably attaching said extension to the axle frame, a driving shaft section journaled in the axle frame, a driven shaft section adapted for operative engagement with the hub of a wheel, a universal coupling arranged within the semi-globular parts aforesaid and operatively connecting said shaft sections together, the upper journal spindle having an axially arranged oil passage and the semi-globular shell having an orifice registering with said oil passage, and a tubular bushing fitting the inner end of said oil passage and engaging in said registering orifice, substantially as set forth.

6. In a traction and steering wheel, the combination of an axle frame having a journal yoke, a tubular arbor providing a bearing for the hub of a wheel and carrying a semi-globular head having opposed journal spindles in journal engagement with the journal yoke aforesaid, a semi-globular shell arranged within said semi-globular head and having bearing contact with the inner wall of said head, adjusting means for maintaining said parts in bearing contact, the same comprising a tubular extension on said shell and a ring nut adjustably attaching said extension to the axle frame, a driving shaft section journaled in the axle frame, a driven shaft section adapted for operative engagement with the hub of a wheel, a universal coupling arranged within the semi-globular parts aforesaid and operatively connecting said shaft sections together, the upper journal spindle having an axially arranged oil passage and the semi-globular shell having an orifice registering with said oil passage, and a tubular bushing fitting the inner end of said oil passage and engaging in said registering orifice, substantially as set forth.

Signed at Chicago, Illinois, this 28th day of August, 1917.

CHESTER T. BANGS.